US007257652B2

(12) United States Patent
Gilliam et al.

(10) Patent No.: US 7,257,652 B2
(45) Date of Patent: Aug. 14, 2007

(54) METHOD AND SYSTEM FOR FILESYSTEM MOUNTED ON A ROOT DIRECTORY WHEREIN DATA IS REDIRECTED FROM A FIRST STORAGE SYSTEM TO A SECOND STORAGE SYSTEM

(75) Inventors: Jerry A. Gilliam, Santa Clara, CA (US); Christopher J. Horne, Boulder, CO (US); Shudong Zhou, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 696 days.

(21) Appl. No.: 10/615,534

(22) Filed: Jul. 7, 2003

(65) Prior Publication Data

US 2005/0010747 A1    Jan. 13, 2005

(51) Int. Cl.
  *G06F 3/00*   (2006.01)
  *G06F 12/16*  (2006.01)
  *G06F 7/00*   (2006.01)
  *G06F 17/00*  (2006.01)
(52) U.S. Cl. .............................. 710/38; 710/8; 710/20; 709/200; 709/202; 709/203; 711/100; 711/114; 711/162; 714/1; 714/2; 714/6
(58) Field of Classification Search .................. 710/20, 710/38; 714/1, 2, 6; 711/100, 114, 162; 709/200, 202, 203
See application file for complete search history.

(56) References Cited

U.S. PATENT DOCUMENTS 6,389,459 B1 *   5/2002  McDowell .................. 706/216
6,477,591 B1 *  11/2002  VanderSpek ................. 710/38

* cited by examiner

*Primary Examiner*—Tammara Peyton
(74) *Attorney, Agent, or Firm*—Martine Penilla & Gencarella, LLP (57) ABSTRACT

An automated method of establishing a filesystem utilizing the establishment of a first filesystem that interfaces with devices by loading software, including a first set of drivers, into memory and initializing the first set of drivers with the devices. The first filesystem is then mounted on a root directory that comprises a single storage device. The method allows input/output functionality within the first filesystem and, while input/output functionality is available to the first filesystem, the method accesses the single storage device to obtain software, including a second set of drivers. The method loads the software into the memory and initializes the second set of drivers with the devices to establish a second filesystem. The second filesystem is mounted on a root directory comprising the single storage device and another storage device and the first filesystem is then rendered inactive.

27 Claims, 6 Drawing Sheets

METHOD AND SYSTEM FOR FILESYSTEM MOUNTED ON A ROOT DIRECTORY WHEREIN DATA IS REDIRECTED FROM A FIRST STORAGE SYSTEM TO A SECOND STORAGE SYSTEM

BACKGROUND OF THE INVENTION

1. Field of the Invention

Embodiments of the present invention relate to the field of data storage systems using filesystem services, e.g., with a computer system. More particularly, embodiments of the present invention relate generally to the remounting of a root filesystem, without interrupting filesystem access service, from one device configuration to another in a computer system having mirrored volume disk storage.

2. Related Art

Secondary data storage is an integral part of large data processing systems. A typical data storage system in the past utilized a single, expansive magnetic disk for storing large amounts of data. For single disk memory storage systems, the speed of data transfer to and from the single, large disk is much slower than the processing speed of the Central Processing Unit (CPU) and acts as a data processing bottleneck. In addition, backup capability is needed for improved reliability and serviceability (RAS). In response to these needs, mirrored, redundant arrays of independent disks (RAIDs) have evolved from the single disk storage systems in order to match the speed of secondary storage access with the increasingly faster processing speeds of the CPU and improved RAS. To increase system throughput, the RAID architecture of secondary storage allows for the concurrent access of data from multiple disk drives.

Whether a system has standard single data storage devices or a RAID system of mirrored devices, there will inevitably come a time when a device will be swapped out due to failure, upgrade, etc. To swap out a device that is tied to a filesystem and mount a new one requires that the filesystem be unmounted from the first device and then mounted on the second. This necessitates the termination and restart of the filesystem services. In the case of the root filesystem, this necessitates rebooting the system. In order to reboot, the input/output (I/O) path from the device containing the root filesystem to the drivers for the new device needs to be known. In the case of booting off a mirrored volume device, this information is supplied to the booting firmware by a device that manages the storage devices, known as a Volume Manager. The Volume Manager needs to be initialized as part of the boot process.

Traditionally, the I/O path information has been supplied from the Volume Manager via a forceload list that is maintained by a system administrator who has the responsibility of maintaining the storage devices. As the complexity of the storage systems has increased, a method has recently become available that allows the Volume Manager to find the drive automatically, independent of the actual path, thus reducing the burden borne by the system administrator. One result of this change is that the path to each of the drivers is no longer a necessarily known quantity. As long as the Volume Manager is running and has I/O available it can dynamically locate the drivers. Therefore, the lack of a defined path would be of no concern. However, this greatly complicates the boot process.

The boot process involves starting with a firmware program such as, in the case of a SUN SPARC platform, for example, an open boot prom (OBP). The OBP firmware takes control Of whatever devices to which it has access by using preloaded drivers from firmware. The firmware programs on the OBP are not the same as the software programs that control the hardware when the operating system (e.g., SUN Solaris) is running. Therefore, the OBP and the operating system cannot both be running and controlling the same hardware, as there could be a conflict in instructions that would confuse the hardware. Thus, the OBP must handoff the hardware controls to the operating system kernel without an overlap. One of the main functions of the OBP firmware is to load and initialize the software that the kernel will need to access the storage system, e.g., create a filesystem.

Figure 1A:
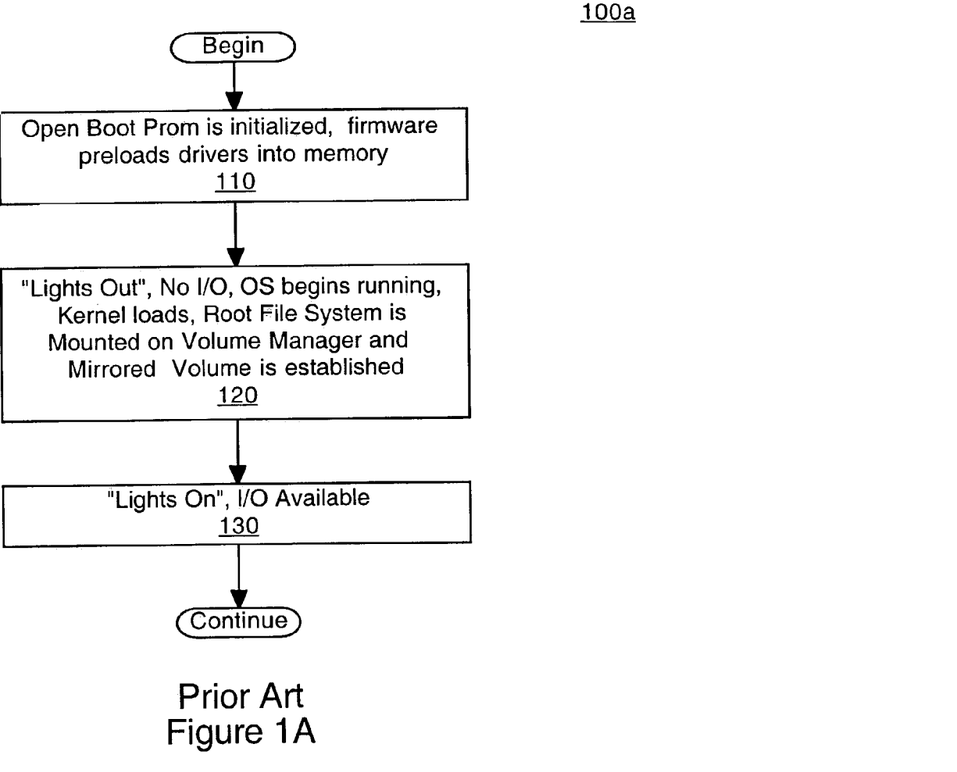
FIG. 1A is a flow diagram of a method for booting up a system on which a root filesystem is to be remounted in accordance with one embodiment of the conventional art.

One way to handle this handoff is shown as process 100*a* of Prior Art FIG. 1A. As shown in step 110, the firmware follows a predetermined forceload list and preloads all the driver modules from disk into memory for the devices that are needed in order to access the root filesystem. These drivers are the ones needed to establish the Volume Manager, in the case of a mirrored system. Then, as shown in step 120, access to I/O is turned off, known as "lights out," at which point the OBP starts running the operating system (OS), but using hardware access via the preloaded driver modules from memory. During this "lights out" period, the root filesystem and the device on which it is mounted (root device) are established by initializing the just loaded drivers, devices, etc. Once the root filesystem is mounted on the root device, the kernel is started and the entire volume of mirrored devices must be established. In the instance of mirrored volumes, the root device is the Volume Manager. Once the rhirrored volume is established, I/O can be regained ("lights on") as exemplified by step 130.

Figure 1B:
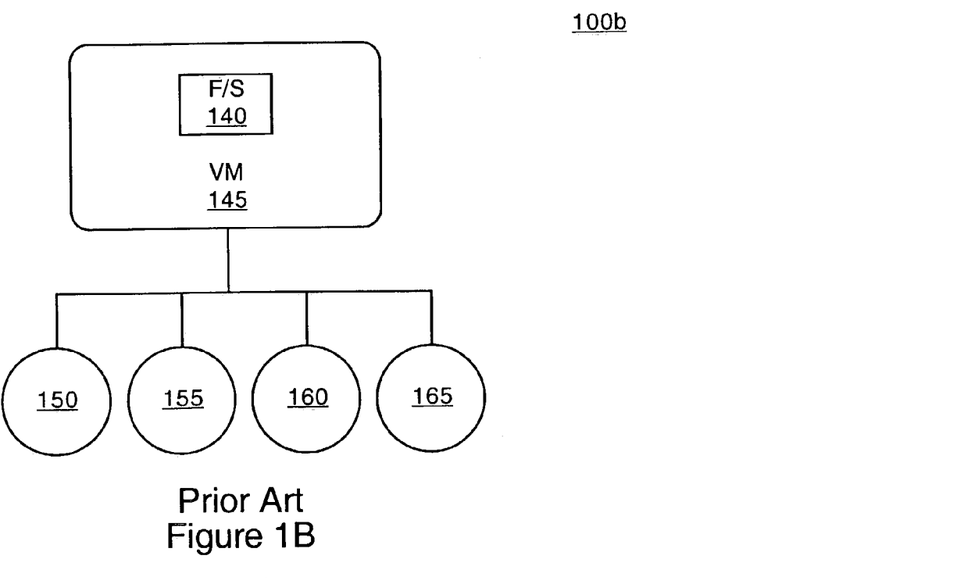
FIG. 1B is a block diagram illustrating a configuration of a root filesystem that has been remounted at the time of "lights on" according to one embodiment of the conventional art.

FIG. 1B is a block diagram showing a mirrored volume in a configuration that may exist following the boot process at the time of "lights on". In this example Filesystem 140 interfaces with the Volume Manager 145 which interfaces with storage devices 150, 155, 160 and 165.

If, in order to initialize, the OS needed to bring something in from a disk during "lights out", the OBP must have been provided a path to the disk. Therefore, if any of the driver components that are needed to mount the Volume Manager 145 are missing, the kernel will fail to start after lights out. Some of the driver modules needed by the OBP, for example in the case of RAID storage systems, are obtained from the Volume Manager which builds the forceload list for the OBP. In the instance where the system is running software in which the Volume Manager finds the drives independent of the actual path, it may not be able to supply the necessary information for the OBP to locate all necessary hardware. In the instance where the system administrator supplies the driver paths, there is always a possibility that there has been an error or omission in the update process.

As upgraded and additional software versions become available and as the mirrored systems become more complex, the burden on the Volume Manager to provide an accurate forceload list becomes great. It would be desirable to reduce this burden on the Volume Manager.

SUMMARY OF THE INVENTION

Accordingly, a need exists for a method and system for allowing the establishment of a filesystem to a storage device with input/output (I/O) remaining available for redirecting the filesystem for access to multiple storage devices, such as mirrored volumes and RAID systems. In other words, a method is needed to eliminate the need, in the case of root filesystem redirection, for completely terminating and subsequently restarting root filesystem services. As a result, the Volume Manager can be freed of the burden of specifying a forceload list because I/O remains active during the initialization of the filesystem.

Specifically, one embodiment of the present invention provides an automated method of establishing a filesystem. The method comprises establishing a first filesystem that interfaces with devices by loading software, including a first set of drivers, into memory and initializing the first set of drivers with the devices.

The first filesystem is then mounted on a root directory that comprises a single storage device. The method allows input/output functionality within the first filesystem and, while input/output functionality is available to the first filesystem, the method accesses the single storage device to obtain software, including a second set of drivers. The method loads the software into the memory and initializes the second set of drivers with the devices to establish a second filesystem. The second filesystem is mounted on a root directory comprising the single storage device and another storage device and the first filesystem is then rendered inactive. According to one embodiment, the software is determined dynamically.

According to one embodiment, the single storage device and another storage device comprise a mirrored pair of drive devices. In one embodiment, the second filesystem is a volume manager and, according to one embodiment the volume manager directs input/output to and from the mirrored pair of drive devices. According to one embodiment, the devices include drive devices, bus controller devices and bus devices.

In one embodiment the method further comprises an application program interfacing with the first filesystem and the second filesystem is established transparently to the application program. The method further comprises the application program interfacing with the second filesystem after the establishment thereof.

In one embodiment, a data storage system is disclosed that includes a processor, a plurality of devices and a memory wherein the memory comprises instructions for implementing a method of transparently remounting filesystems.

According to one embodiment, an automatic method of establishing a filesystem for accessing a plurality of storage devices is disclosed. The method includes booting from a firmware program that comprises firmware drivers. The booting process includes using the firmware drivers, accessing a first set of drivers from a first storage device and, using the first set of drivers, establishing a first filesystem mounted on a root directory that comprises the first storage device. Once the first filesystem is established, enabled input/output functionality of the first filesystem to the root directory is utilized to access a second set of drivers from the first storage device. The second set of drivers is then used to establish a second filesystem mounted on a root directory. The root directory comprises a number of storage devices including the first storage device. The first filesystem is then rendered inactive.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic information capable of being stored, transferred, combined, compared, and otherwise manipulated in a computer system. It has proven convenient at times, principally for reasons of common usage, to refer to these information as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "redirecting," "mounting," "converting," "opening," "flushing," "suspending," "creating," "pointing," "transmitting," "receiving," "closing," "enabling," "generating," or the like, refer to actions and processes of a computer system or similar electronic computing device. The computer system or similar electronic computing device manipulates and transforms data represented as physical (electronic) quantities within the computer system memories, registers or other such information storage, transmission or display devices.

Figure 2:
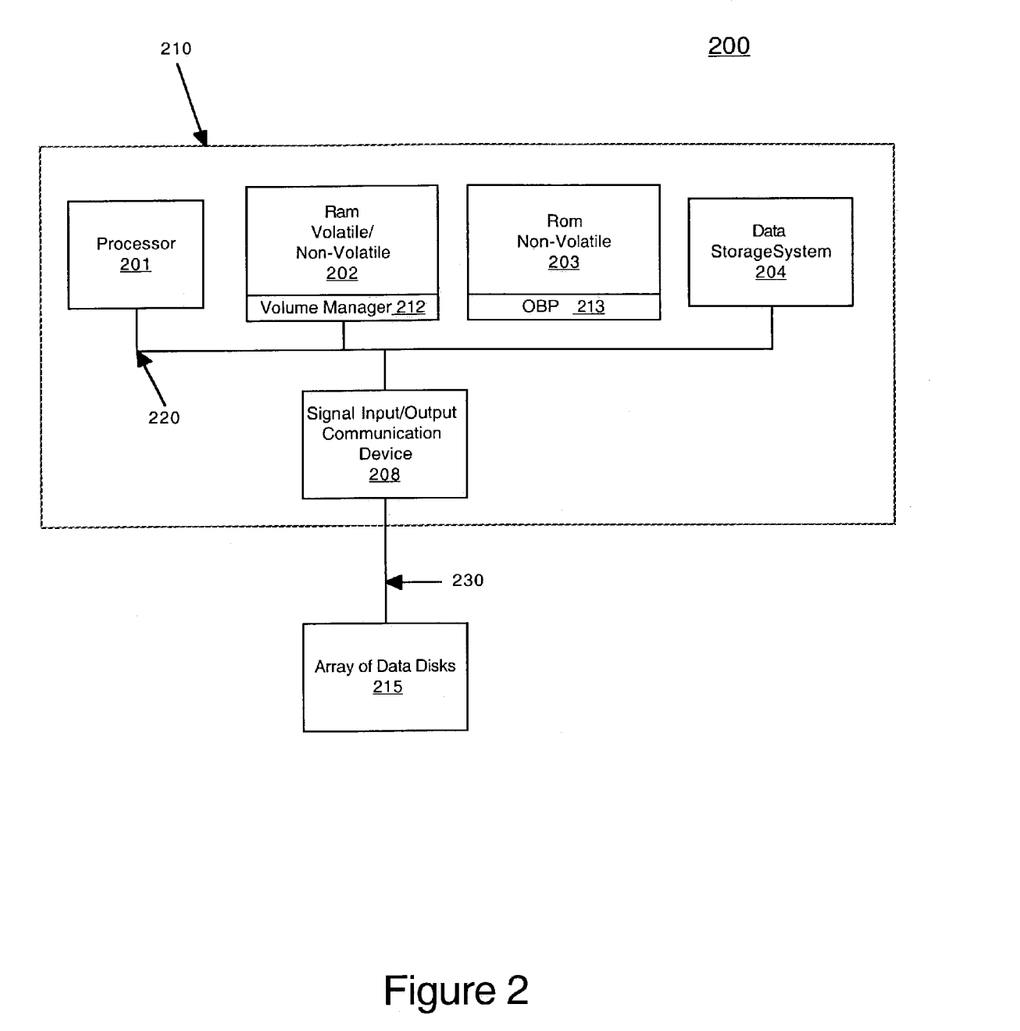
FIG. 2 is a logical block diagram of an exemplary computer upon which an embodiment of the present invention may be practiced.

Referring to FIG. 2, embodiments of the present invention are comprised of computer-readable and computer-executable instructions that reside, for example, in computer-readable media of an electronic system, such as a host computer system or embedded system. FIG. 2 is a block diagram of exemplary embedded components of a computer system 210 upon which embodiments of the present invention may be implemented. Exemplary computer system 210 includes an internal address/data bus 220 for communicating information, a central processor 201 coupled with the bus 220 for processing information and instructions, a volatile memory 202 (e.g., random access memory (RAM), static RAM dynamic RAM, etc.) coupled with the bus 220 for storing information and instructions for the central processor 201, such as instructions for Volume Manager 212, and a non-volatile memory 203 (e.g., read only memory (ROM), programmable ROM, flash memory, EPROM, EEPROM, etc.) coupled to the bus 220 for storing static information such as Open Boot PROM (OBP) firmware 213 and other instructions for processor 201.

With reference still to FIG. 2, an optional signal Input/Output (I/O) device 208 is shown. The I/O device 208 is coupled to bus 220 for providing a communication link between computer system 210 and an array network of data storage devices, such as disks. As such, signal I/O device 208 enables the central processor unit 201 to communicate with or monitor other electronic systems blocks that are coupled to the computer system 210. In one embodiment of the present invention, the input and output device 208 is a serial communication port, but could also be any number of well known communication standards and protocols, e.g., Universal Serial Bus (USB), Ethernet, infrared (IR) communication, Bluetooth wireless communication, etc. Instructions and data from the computer system 210 travel through the port and onto an external bus 230 that provides for data transfer between components of the data storage system 204, including between volume manager 212, processor 201 and an array of data disks and associated drives 215.

Figure 3A:
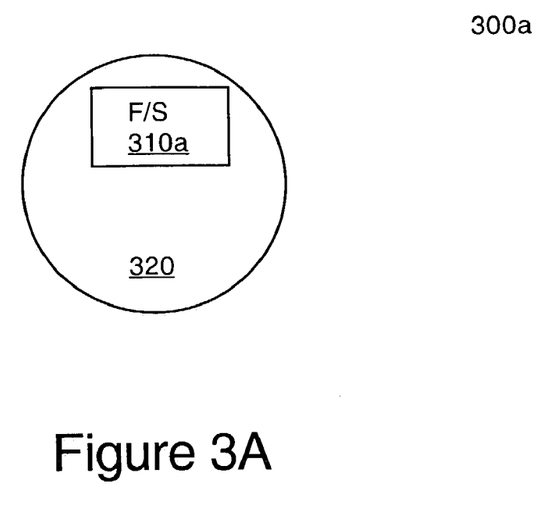
FIG. 3A is a block diagram illustrating a filesystem residing on a first device in accordance with an embodiment of the present invention.

FIG. 3A is a block diagram 300a illustrating a filesystem 310a mounted on a first device 320 in accordance with an embodiment of the present invention. Filesystem 310a may need to be moved from first device 320, (e.g., a disk), to another device (e.g. second device 330 of FIG. 3B). This may be a result of a fault on device 320, the installation of a newer device, a boot-up process or any one of a number of reasons for moving a filesystem from one device to another. In one embodiment, filesystem 310a is mounted on a single disk.

Figure 3B:
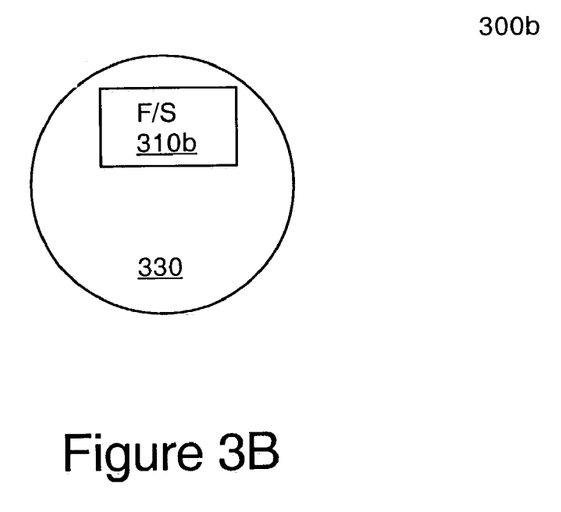
FIG. 3B is a block diagram illustrating a filesystem residing on a second device following redirection in accordance with an embodiment of the present invention.

FIG. 3B is a block diagram 300b illustrating a second filesystem 310b mounted on a second device 330 or group of devices following redirection as defined below with respect to FIG. 4, in accordance with an embodiment of the present invention. Second device 330 may be a disk, a Volume Manager supplying the filesystem data to a set of disks or any of a number of file storage devices known to those skilled in the art of information management.

Figure 4:
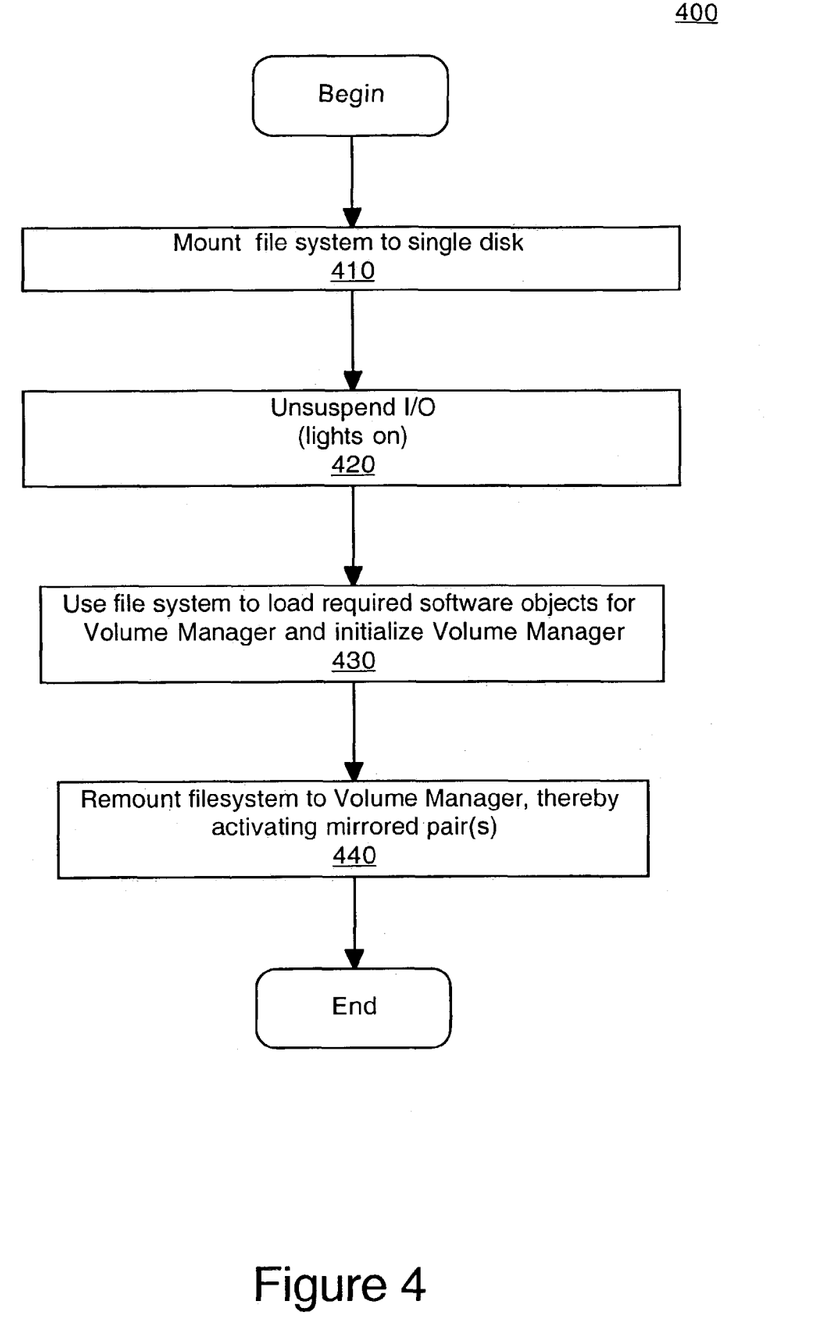
FIG. 4 is a flow diagram illustrating an overview of a computer-implemented process for redirecting a filesystem from a single disk device to a Volume Manager in accordance with one embodiment of the present invention.
Figure 6:
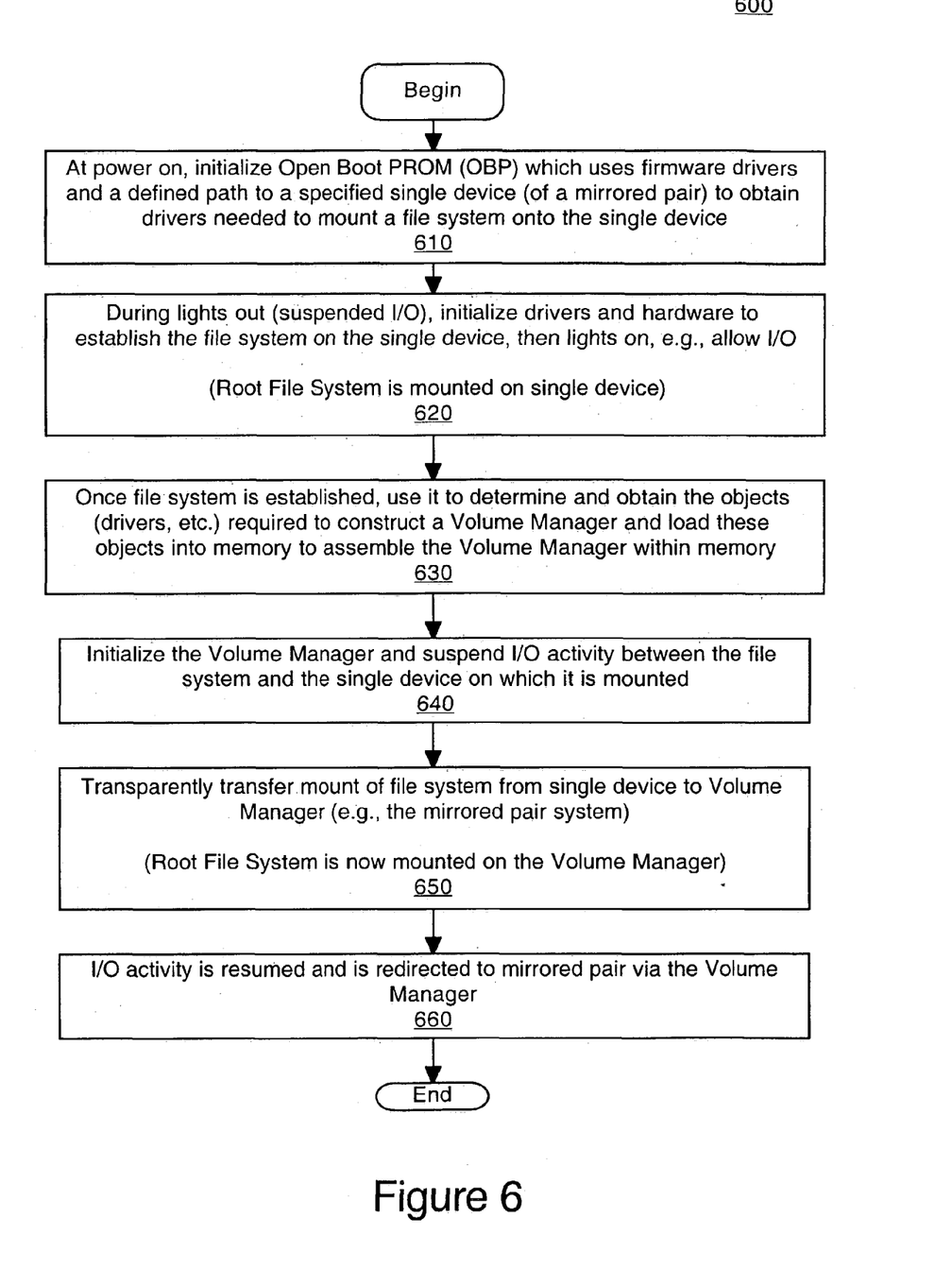
FIG. 6 is a flow diagram of a computer-implemented process for redirecting a filesystem from a disk to a Volume Manager in accordance with one embodiment of the present invention.

FIGS. 4 and 6 below are flow diagrams 400 and 600 of computer-implemented processes for redirecting a filesystem from one device to another device in accordance with embodiments of the present invention. Flow diagrams 400 and 600 include processes of the present invention which, in various embodiments, are carried out by a processor and electrical components under the control of computer readable and computer executable instructions. The computer readable and computer executable instructions may reside, for example, in data storage features such as volatile memory 202 and/or non-volatile memory 202 or 203 of FIG. 2. However, the computer readable and computer executable instructions may reside in any type of readable storage medium. Although specific steps are disclosed in flow diagram 400, such steps are exemplary. That is, the present invention is well suited to performing various other steps or variations of the steps recited in FIGS. 4 and 6. Within the present embodiment, it should be appreciated that the steps of flow diagrams 400 and 600 may be performed by software, by hardware or by any combination of software and hardware.

FIG. 4 is a flow diagram 400 of a general overview of the steps in a computer-implemented process for redirecting a filesystem (e.g., 310a of FIG. 3A) from a single device (e.g., 320 of FIG. 3A) to another device (e.g., 330 of FIG. 3B) such as a Volume Manager, in accordance with one embodiment of the present invention.

In step 410, a filesystem is mounted to a single disk. The mounting process involves several steps that include using firmware drivers to obtain the necessary drivers (from the single disk) for mounting the filesystem to the single disk. While the drivers for mounting the filesystem are being loaded to memory, input/output (I/O) activity is suspended so that there is no overlap between the firmware controlling the drivers and the operating filesystem to which the driver control is being transferred. While lights out is in effect, the drivers and hardware for establishing the filesystem are initialized on the single disk. Although only one disk is being used at this point, the single disk may be part of a disk array.

In step 420, according to one embodiment, the I/O activity is reinstated (lights on). The root filesystem 310a is now mounted on the single device 320 and all I/O is available for the following step.

Next, in accordance with one embodiment and as illustrated in step 430, the currently mounted filesystem on device 320 is used to load the software objects needed for a Volume Manager 330. With I/O available, any objects determined to be missing from a configuration list may be reported and the path to any missing objects may be determined according to the functionality of the active system. In the case of certain storage systems in which the Volume Manager finds the drives independent of a preconfigured path, the availability of I/O allows the Volume Manager 330 to be loaded. Once loaded, the Volume Manager is initialized. This creates a second filesystem, one including the Volume Manager.

In step 440 of FIG. 4, the I/O between the second filesystem and device 320 is suspended and the second filesystem is transparently remounted to the Volume Manager 330 so that the mirrored pair system becomes activated. Device 320 is then closed and I/O activity is reinstated to the second filesystem 310*b* via the Volume Manager, in accordance with one embodiment, and the process ends.

Figure 5A:
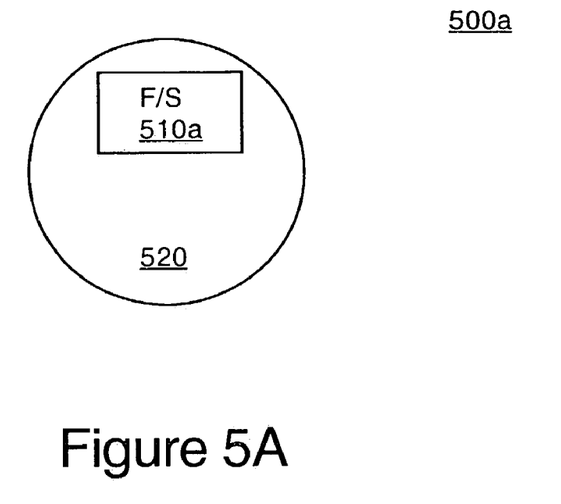
FIG. 5A is a block diagram illustrating a filesystem residing on a disk in accordance with an embodiment of the present invention.

FIG. 5A is a block diagram 500*a* illustrating a first filesystem 510*a* mounted on a disk 520 in accordance with an embodiment of the present invention. Filesystem 510*a* may need to be moved from first device 520, (e.g., a disk), to a second device (e.g. Volume Manager 515 of FIG. 5B). For example, during a boot up on a computer operating system such as a SUN Microsystems Solaris™ operating environment, having a set of mirrored volumes of disk storage devices, it may be desirable to minimize the paths that the boot software/firmware uses to mount the root filesystem, thus minimizing the time that the input/output (I/O) activity is suspended. One way to do so is, according to an embodiment of the present invention, to mount the root filesystem on a single disk during the boot up. Once the operating system (e.g., Solaris™) is up and running and the I/O is available, it may be remounted on the Volume Manager that, in turn, affords the volume of mirrored devices access to the root filesystem.

Figure 5B:
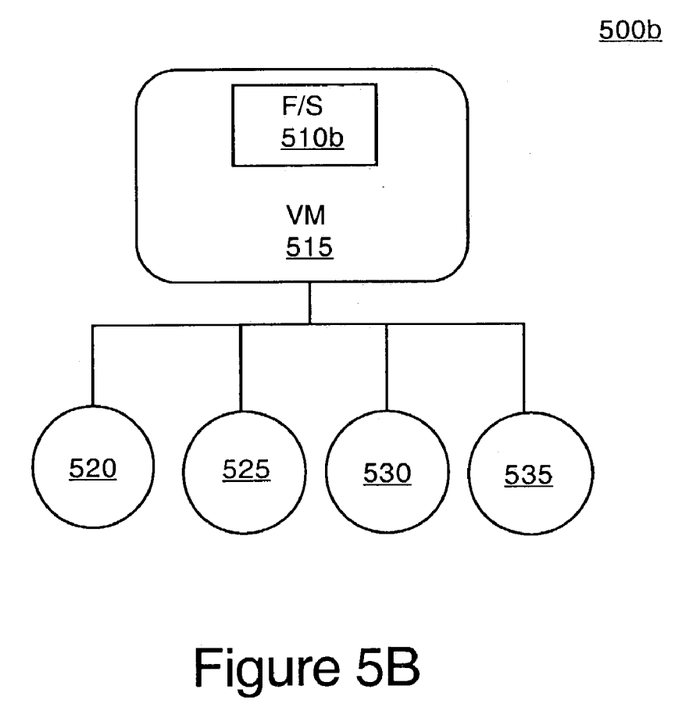
FIG. 5B is a block diagram illustrating a having been redirected to a Volume Manager in accordance with an embodiment of the present invention.

FIG. 5B is a block diagram illustrating a second filesystem 510*b* mounted on a Volume Manager 515 following redirection, in accordance with an embodiment of the present invention. Volume Manager 515 manages a mirrored volume of data storage disks 520, 525, 530 and 535, according to one embodiment. The Volume Manager 515 has the responsibility of knowing the location of drivers for the volume of managed disks. In order to know these locations, in some instances, the Volume Manager may need to have I/O activity available.

FIG. 6 is a flow diagram of a computer-implemented process 600 for redirecting a filesystem (e.g., filesystem 510*a* of FIG. 5A) from a disk (e.g., disk 520 of FIG. 5A) to a Volume Manager (e.g., Volume Manager 515 of FIG. 5B) during a boot-up process, in accordance with one embodiment of the present invention. In step 610, the boot firmware, such as Open Boot PROM (OBP) that is run on the SUN Solaris™ operating system, is initialized. It is appreciated that any combination of hardware and/or software components may be used to realize such a process and OBP is only one example.

As illustrated by step 610 of process 600 and in accordance with one embodiment of the present invention, at the time of power on, the OBP is initialized. The initialization of the OBP uses firmware drivers and a defined path to a specified single device 520. Single device 520, according to one embodiment, is one disk of a mirrored volume. From this single device, the OBP obtains the drivers needed to mount first filesystem 510*a* onto the single device 520.

Whereas, if the filesystem were to be mounted directly to a Volume Manager for managing a system of mirrored pairs, the determination of the drivers and objects necessary for initializing the Volume Manager would be more complex than those needed for mounting to the single device. Also, since the initialization process requires the suspension of I/O so as not to have overlapping systems controlling the same hardware, if drivers or objects were missing or unknown, the initialization would fail without notification of missing objects.

Still referring to FIG. 6, in step 620, according to one embodiment, the I/O is suspended (lights out) and the drivers and hardware needed to establish the root filesystem on the single device are initialized. Once the initialization process is complete, the root filesystem (e.g., filesystem 510*a* of FIG. 5A) is mounted on the single device 520, and the system kernel is up and running. The I/O is then enabled (lights on).

As illustrated by step 630, once the first filesystem is established and the I/O is enabled, the first filesystem may be used to determine and obtain the location of objects and/or devices needed to construct a Volume Manager according to one embodiment. The objects and/or devices may comprise such items as software drivers, bus devices, bus controller devices, bus drivers, or any object or device needed for the complete establishment of the Volume Manager. A character string may furnish the paths to the devices, or they may be determined dynamically by the Volume Manager during its initialization process.

In step 640 of process 600, according to one embodiment, the Volume Manager is initialized and I/O activity is suspended between the single device 520 and the root filesystem 510. At this point, a second filesystem 510*b* has been created that includes the Volume Manager.

The root filesystem 510*b* is then, in accordance with one embodiment of the present invention and as illustrated in step 650 of FIG. 6, transparently transferred from single device 520 to Volume Manager 145. By being transparently transferred, any application program that may be interfacing with the root filesystem as mounted on the single device, at the time of the transfer to the Volume Manager the application program would continue running on the root filesystem as mounted on the Volume Manager. Since the system kernel is up and running during the transfer, any available system software task may be performed, such as transitioning from the single disk to the mirrored pair. This transition assumes that the data on the two disks of a mirrored pair is identical. At this point, the root filesystem is mounted on the Volume Manager.

In step 660 of FIG. 6, the I/O activity is resumed, in accordance with one embodiment of the present invention, thus permitting the second filesystem 510*b* to now access data from the Volume Manager. The Volume Manager may now direct input/output to and from the mirrored pair of devices. The process is now complete and the flow diagram is exited.

Table 1 below is a glossary of terms as used in ensuing tables of pseudo code that might be used in a Solaris™ operating environment as provided by Sun Microsystems for establishing a new device for mounting a root filesystem. The function commands and terms may include, but are not limited to, those described in the following paragraphs and associated tables.

TABLE 1

I/O: Input/Output. A read from, or a write to, a device.
Block I/O: I/O performed in granularity of a defined block size.
filesystem: A service providing directory and file semantics layered on top of a device providing block I/O services.
mount: The act of instantiating a filesystem's services, with I/O operations directed to an underlying device.
unmount: The act of terminating a previous mount operation. All filesystem services must cease to complete the unmount.
dev_t: A device reference.
open: Initializing a device instance to accept I/O requests.
close: Notifying an open device instance that I/O requests have ceased.
vnode: A file reference. Also called filesystem metadata.
inode: A filesystem-specific form of a vnode.
boot: The operation of instantiating the services provided by the system.
boot device: The device on which the system is booted. Interchangable with root device.
root: The filesystem of the boot device.
volume: A device composed of multiple physical devices.

TABLE 1-continued mirror: A volume composed of devices organized in one or more symmetric subsets, with each subset containing identical data. Redundancy permits recovery in the event of a physical device failure.
SVM: Solaris Volume Manager. The software component of Solaris capable of constructing volumes built on individual physical devices.

Table 2 below illustrates one example of pseudo code that may be used in a Solaris™ operating environment as provided by Sun Microsystems for initializing a new device, (e.g., Volume Manager 515) onto which the root filesystem is to be redirected, as shown in step 630 of FIG. 6 in accordance with one embodiment of the present invention.

TABLE 2 open new device
get dev_t used by root filesystem, on currently mounted boot device
get dev_t of disk volume device, on which root filesystem is to be remounted
create vnode for new root device
open new root device vnode Table 3 below illustrates one example of pseudo code that may be used in a Solaris™ operating environment as provided by Sun Microsystems for suspending I/O activity between the root filesystem (e.g., filesystem 510 of FIG. 5A) and the currently mounted device, (e.g., disk 520 of FIG. 5A), as shown in step 640 of FIG. 6 in accordance with one embodiment of the present invention.

TABLE 3 suspend I/O activity from filesystem to currently mounted device
flush any outstanding I/O's to currently mounted device
suspend root filesystem I/O activity to root device Table 4 below illustrates one example of pseudo code that may be used in a Solaris™ operating environment as provided by Sun Microsystems for transparently transferring filesystem references from the old (currently mounted) device 520 to the new device (e.g., Volume Manager 515), as shown in step 650 of FIG. 6 in accordance with one embodiment of the present invention.

TABLE 4 redirect all filesystem references from old device to the new device
redirect references from original root device to new root device
convert buf reference of root filesystem inode from original root device to new root device
convert all cached inodes with an old root dev_t reference to refer to the dev_t of the new root device
point global root filesystem references to new root dev_t and new root vnode Table 5 below illustrates one example of pseudo code that may be used in a Solaris™ operating environment as provided by Sun Microsystems for unsuspending I/O activity in accordance with the embodiment of step 660 of process 600.

TABLE 5 unsuspend I/O activity, permitting filesystem to now access file data and filesystem metadata from new device.
enable root filesystem I/O to new root device
close old device TABLE 5-continued close old root device
release vnode of old root device Following the redirection of the root filesystem from the originally mounted device, the Volume Manager on which the root filesystem is now mounted is currently providing access for the mirrored volume to the file data and filesystem metadata. In this manner the filesystem has been redirected with no need for complete termination and restart of filesystem services and with I/O availability for determining the driver paths during Volume Manager establishment. The process now exits flow diagram 600.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An automated method of establishing a filesystem comprising:
    a) establishing a first filesystem which interfaces with devices by loading software, including a first set of drivers, into memory and initializing said first set of drivers with said devices, said first filesystem mounted on a root directory comprising a single storage device;
    b) allowing input/out functionality within said first filesystem; and
    c) while input/output functionality is made available to said first filesystem, accessing said single storage device to obtain software, including a second set of drivers, and loading said software into said memory said initializing said second set of drivers with said devices to establish a second filesystem, wherein said second filesystem is mounted on a root directory comprising said single storage device and another storage device and wherein said first filesystem is rendered inactive.

2. A method as described in claim 1 wherein said single storage device and said another storage device comprise a mirrored pair of storage devices.

3. A method as described in claim 1 wherein said second filesystem comprises a volume manager.

4. A method as described in claim 2 wherein said second filesystem comprises a volume manager which directs input/output to and from said mirrored pair of storage devices.

5. A method as described in claim 1 wherein said devices comprise:
    storage devices;
    bus controller devices; and
    bus devices.

6. A method as described in claim 1 further comprising an application program interfacing with said first filesystem and wherein said second filesystem is established transparently to said application program and further comprising said application program interfacing with said second filesystem after the establishment thereof.

7. A method as described in claim 1 wherein said software of said c) is determined dynamically.

8. A data storage system comprising a processor, a plurality of devices and a memory wherein said memory comprises instructions for implementing a method of transparently remounting filesystem comprising:
   a) establishing a first filesystem which interfaces with said plurality of devices by loading software, including a first set of drivers, into said memory and initializing said first set of drivers with said plurality of devices, said first filesystem mounted on a root directory comprising a single storage device;
   b) activating input/output functionality within said first filesystem; and
   c) while input/output functionality is made available to said first filesystem, accessing said single storage device to obtain software, including a second set of drivers, and loading said software into said memory and initializing said second set of drivers with said plurality of devices to establish a second filesystem, wherein said second filesystem is mounted on a root directory comprising said single storage device and another storage device and wherein said first filesystem is rendered inactive.

9. A data storage system as described in claim 8 wherein said single storage device and said another storage device comprise a mirrored pair of storage devices.

10. A data storage system as described in claim 8 wherein said second filesystem comprises a volume manager.

11. A data storage system as described in claim 9 wherein said second filesystem comprises a volume manager which directs input/output to and from said mirrored pair of storage devices.

12. A data storage system as described in claim 8 wherein said plurality of devices comprise:
   storage devices;
   bus controller devices; and
   bus devices.

13. A data storage system as described in claim 8 further comprising an application program interfacing with said first filesystem and wherein said second filesystem is established transparently to said application program and wherein said method further comprises said application program interfacing with said second filesystem after the establishment thereof.

14. A data storage system as described in claim 8 wherein said software of said c) is determined dynamically.

15. An automated method of establishing a filesystem for accessing a plurality of storage devices, said method comprising:
   a) booting from a firmware program which comprises firmware drivers, wherein said booting comprises:
      a1) using said firmware drivers, accessing a first set of drivers from a first storage device; and
      a2) using said first set of drivers, establishing a first fileystem mounted on a root directory comprising said first storage device;
   b) once said first filesystem is established, utilizing enabled input/output functionality of said first filesystem to said root directory to access a second set of drivers from said first storage device; and
   c) using said second set of drivers, establishing a second filesystem mounted on a root directory comprising a plurality of storage devices including said first storage device and wherein said first filesystem is rendered inactive.

16. A method as described in claim 15 wherein said a2) comprises:
   loading said first set of drivers into memory;
   disabling said input/output functionality to said first storage device;
   initializing said first set of drivers and devices associated with accessing said first storage device to attach said first filesystem to said storage device; and
   resuming said input/output functionality to said first storage device.

17. A method as described in claim 15 wherein said plurality of storage devices comprise a mirrored pair of storage devices.

18. A method as described in claim 15 wherein said second filesystem comprises a volume manager.

19. A method as described in claim 15 wherein said first set of drivers are defined according to a predetermined forceload list within said firmware.

20. A method as described in claim 17 wherein said second filesystem comprises a volume manager which directs input/output to and from said mirrored pair of storage devices.

21. A method as described in claim 15 further comprising an application program interfacing with said first filesystem and wherein said second filesystem is established transparently to said application program and further comprising said application program interfacing with said second filesystem after the establishment thereof.

22. A method as described in claim 15 wherein said second set of drivers is determined dynamically.

23. A method as described in claim 19 wherein said second set of drivers is determined dynamically.

24. An automated method of transparently transferring from a first filesystem to a second filesystem comprising:
   a) booting from a firmware program which comprises firmware drivers, wherein said booting comprises:
      a1) using said firmware drivers, accessing a first set of drivers from a first storage device, said first set of drivers specified within a predetermined firmware listing; and
      a2) using said first set of drivers, establishing a first filesystem mounted on a root directory comprising said first storage device;
   b) once said first filesystem is established, utilizing enabled input/output functionality of said first filesystem to said root directory to access a second set of drivers from said first storage device and software for constructing a volume manager; and
   c) using said second set of drivers and said software, establishing a second filesystem, comprising said volume manager, and mounted on a root directory comprising a plurality of storage devices configured as at least one mirrored pair and wherein said first fielsystem is rendered inactive.

25. A method as described in claim 24 wherein said second set of drivers is determined dynamically.

26. A method as described in claim 24 wherein said volume manager directs input/output to and from said at least one mirrored pair.

27. A method as described in claim 24 wherein said second filesystem is established transparently.

\* \* \* \* \*